April 12, 1966  H. HEYMANN  3,245,615
CONTROLLING MECHANISM FOR DELIVERY DEVICES
OF DATA PROCESSING MACHINES
Filed March 5, 1964  3 Sheets-Sheet 1
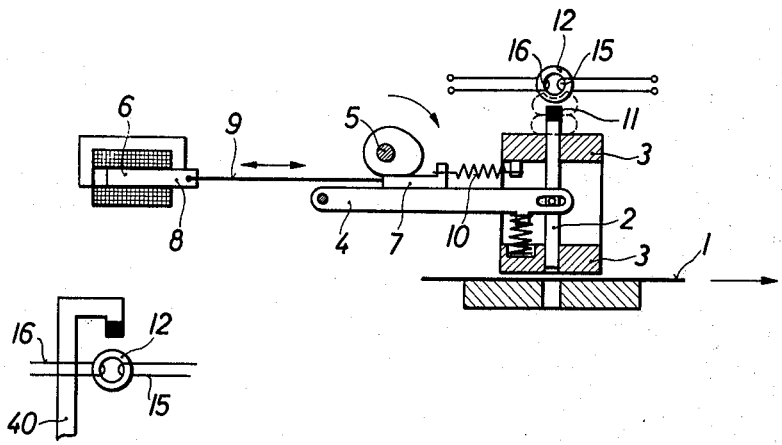
FIG. 1
FIG. 6
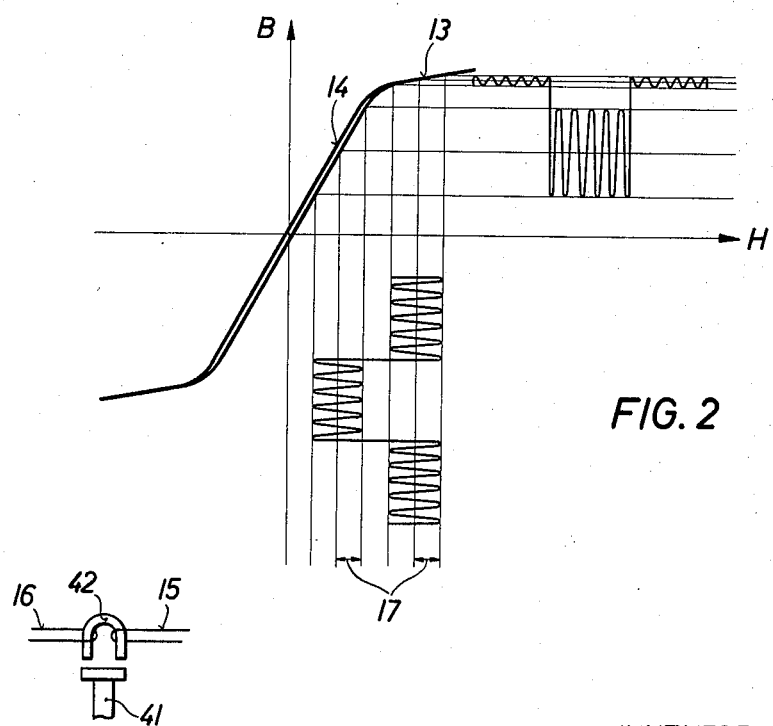
FIG. 2
FIG. 7
INVENTOR
HANS HEYMANN
BY: Toulmin & Toulmin
ATTORNEYS

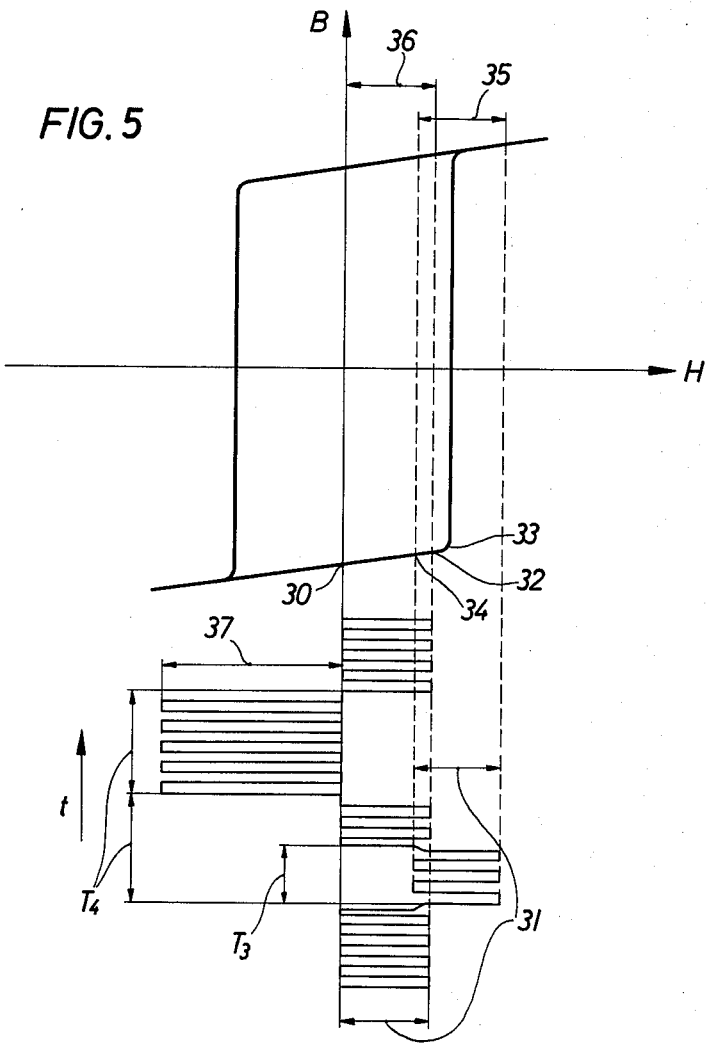

United States Patent Office 3,245,615
Patented Apr. 12, 1966

3,245,615
CONTROLLING MECHANISM FOR DELIVERY
DEVICES OF DATA PROCESSING MACHINES
Hans Heymann, Wilhelmshaven, Germany, assignor to
Olympia Werke A.G., Wilhelmshaven, Germany
Filed Mar. 5, 1964, Ser. No. 349,590
Claims priority, application Germany, Mar. 14, 1963,
O 9,292
10 Claims. (Cl. 234—33)

The present invention relates to a sensing device for controlling the working member of a machine. More particularly, this invention relates to a sensing device which directly senses the movements of the working member of a machine by a pair of sensing members having relative movement between them in an interlinking magnetic field and in which one of the sensing members is attached to the working member.

As is true with all data processing machines, it is desirable to have a check on the working members such as punches or printing devices to insure that the working member is functioning properly. This checking is frequently done at a subsequent station in the machine which involves additional handling equipment of the punched card, for example, and also involves additional equipment to translate the punched holes in the above example into electric impulses in order that the received and the delivered signals can be compared. In such a procedure the grasping of these punched records immediately after their formation involves serious mechanical difficulties in addition to the increased cost of the apparatus.

The object of this invention is to produce data processing machines of the type above referred to, and at the lowest possible cost, which will contain all the necessary parts of a dependable controlling mechanism. For the solution of this problem the main requirement is that for every delivering or recording member there should be two movable sensing members which are movable relative to each other and are traversed by the same magnetic field and are provided with at least one secondary coil. The relative movement of the sensing members is then coupled with the working movement of the recording member associated therewith so as to cause a change of flux of the interlinking magnetic field.

A further object of this invention is to devise magnetic sensing members which can respond to relatively small measurements and which can generate electric control signals in the secondary coils by the working movements of the associated recording member, and which make it possible to sense directly the working movements of the recording member directly, without adding any mechanical complications to the delivery mechanism. The number of possible sources of error is also kept at a minimum by this invention because there is no additional mechanism between the movable recording member and the record produced thereby.

According to another feature of this invention, one member of the pair of sensing organs can consist of a permanent magnet which moves in unison with the recording member while the other member of that pair consists of a magnet with a curved magnetization line, which magnet serves as carrier of the secondary coil which has modulated signals induced in it. In such an apparatus the magnetization of the coil carrier will vary between the two extreme values of its reversible permeability. The same is also true of the A.C. inductivity of the sensing coil mounted thereon, from which impulses can be obtained for the scheduled movement of the recording member.

If, e.g., because of the difficulty of machining them, the use of a permanent magnet as one member of the pair of sensing members is to be avoided, then such member may be formed of material that has a curved magnetization line with at least two coils on it, one of which is energized by a steady magnetizing current while at least another one of these coils is energized by a modulated interrogation signal. The other sensing member would then be formed of highly permeable soft magnetic material and would partake of the working movement of the associated carrier of the recording member in such a manner that the magnetic reluctance of the two sensing members for the magnetic field that traverses them, and hence also the degree of saturation of the coil-carrier, will experience a change.

In another form of this invention the coil-carrier is formed of a material whose magnetization curve is approximately rectangular. Such materials, in contrast to those with a pronounced hysteresis curve, exhibit a stronger curvature of the magnetization curve which at the margins of the hysteresis loop has a buckled form. An especially favorable relation between useful signals and disturbances is thus realized.

The use of coil carriers with rectangular hysteresis loops makes it possible to use a special sensing method in which the state of magnetization of the coil carrier is brought from a first excellent remanence state to a second one, and which is retained irrespective of the further working movement of the recording member up to the next reversing impulse. The control signal for the performance of a working movement remains here in the form of the corresponding remanence condition during the performance of the movement, so that the interrogation and evaluation are to some extent independent of the extent of the movement. The resetting to the original remanence condition can then be effected in an interrogation coil by means of a current signal with corresponding polarity.

Further details of this invention will now be described with reference to the drawings in which:

FIGURE 1 shows in cross section a controlling mechanism according to this invention for a band perforator;

FIGURE 2 shows diagrammatically one form of this invention relative to the characteristic magnetization curve of the coil carrier;

FIGURE 5 shows diagrammatically the modification of FIGURE 4 relative to the characteristic magnetization curve of the coil carrier;

FIGURE 6 shows diagrammatically a variation of the mechanism shown in FIGURE 1; and FIGURE 7 shows another form of the invention.

Figure 3:
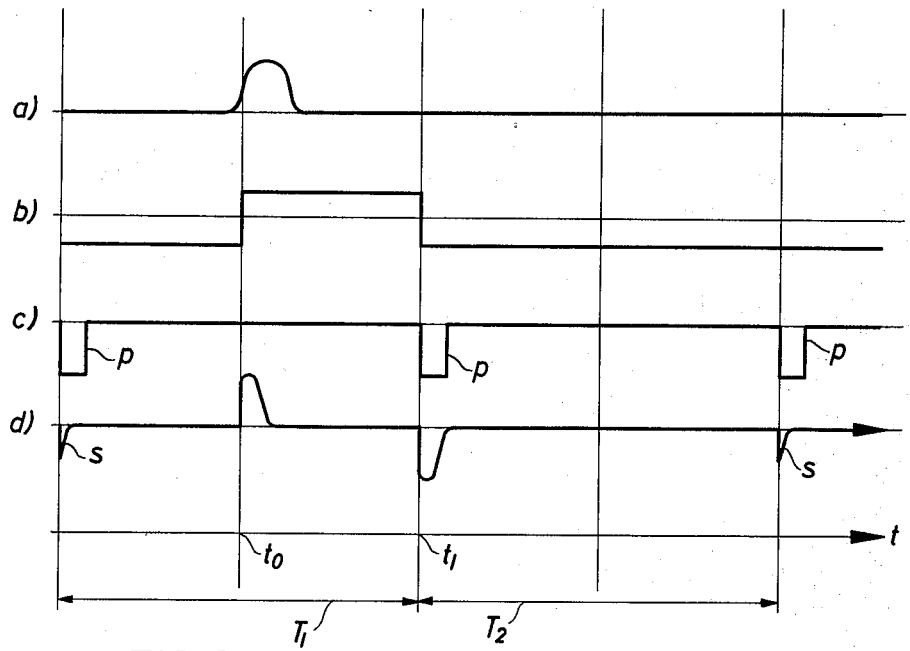
FIGURE 3 shows, by means of an impulse plan, another method of using this invention.

In FIGURE 1 the strip 1 which is being perforated runs horizontally under a suitable number of punching machines 2, only one of which is visible from the side as seen in FIGURE 1. The punches are movable vertically in guides 3 and are operated by a swinging lever 4 actuated by a cam shaft 5. The selection of the punching machines and the coupling of them with the driving mechanism is accomplished by electric servo-magnets 6 which are energized by electric impulses corresponding to the information that is to be recorded to cause them to selectively retract the pressure pieces 7 by means of armatures 8 and wires 9 to move the pressure piece between the cam and the lever for actuating the punch. In that manner power connections are established between the cam shaft and the respective punches. For returning the pressure pieces 7 to their original positions, springs 10 are provided.

Even in such a relatively simple mechanism there are, as experience has shown, many possible sources of error between the source of information in the control circuit (not shown) of the servo-magnets and the place of delivery by the reciprocating punch. Possible causes of such errors are to be found not only in the electric circuits but also in the mechanical parts of the apparatus, e.g., by the introduction of foreign bodies into the paths of the moving parts, or by breakage or over-straining of parts.

For taking care of all these places of possible failure, permanent magnets 11 are fastened to the upper ends of the reciprocating punches so that they will participate in the working movements of the punches. For each reciprocating punch there is also provided an annular core 12 as a coil carrier for two secondary coils. The positions of these cores are so chosen that the permanent magnets 11 during the vertical movements of the punches will produce maximum changes of magnetic field intensities in the cores. The annular cores consist of a material with pronounced magnetic saturation whose magnetization curve $B=f(H)$ has a sudden bend or knee as in FIGURE 2. The width of the hysteresis loop is of no consequence here. It can therefore be assumed to be very narrow as shown in FIGURE 2.

The change of magnetization of the annular core which results from the movement of each punch is so adjusted that it will occur between points 13 and 14 on the magnetization curve where there will be a pronounced change in the degree of saturation or of reversible permeability. In the apparatus of FIGURE 1 the permanent magnets 11 will be closest to the annular core when the machine is at rest. The core will then have the maximum magnetic field induced in it, corresponding in FIGURE 2 to point 13 on the magnetization curve where the magnetic induction for a certain change of magnetizing force is only very small. When however the punch moves to its lowest position corresponding to the point 14 on the curve the induced field will diminish while the reversible permeability of the core will reach its highest value.

As shown in FIGURE 1, each annular core carries two coils 15 and 16 which convert the changing magnetic flux in the core into electric signals. The mutual inductance between the two coils will behave like the reversible permeability and will change accordingly during passage from point 13 to point 14 on the curve from a negligible value to a maximum value. If now one of these coils carries an alternating current of constant amplitude supplied by a generator (not shown), there will be a magnetic field of amplitude 17 superimposed on the magnetization already present in the core between points 13 and 14 on the curve. In the second coil however a substantial A.C. voltage will be induced only when the corresponding reciprocating punch is in its lowest position. The voltage that is obtained from the second coil is therefore in the form of a modulated sinusoidal impulse whose duration is determined by the upward movement of the punch and signals a completed punching of the record carrier. The signal can accordingly be delivered to a conventional control circuit for comparison with the corresponding input signal which in turn constitutes a fault-finding or testing signal.

The construction shown in FIGURE 1 can be readily modified by arranging the parts in such a manner that when the machine is at rest the permanent magnets will be at a maximum distance from the cooperating coil carriers so that the premagnetization will be a maximum when the punch 40 is in its working position as shown in FIGURE 6. Instead of a working stroke being signaled, the A.C. signal will then indicate that the machine is at rest.

Instead of a permanent magnet whose field, according to the position of the punch, determines the magnetization of the corresponding coil carrier, use can also be made of an armature 41 of soft iron as shown in FIGURE 7. The movement of the armature toward or from the coil carrier 42 will change the magnetic reluctance of the latter so that the effect of the A.C. magnetic field that is imposed on the coil carrier will depend on the position of the punch. The coil carrier 42 instead of being in the form of a closed ring, can also be an open ring or can be U-shaped so that the movable armature can close or open the air gap. This will produce a stronger change of magnetization of the coil carrier.

As coil carriers for these sensing coils, use can be made of the annular cores that are generally used as storage elements for coded binary information whose magnetization curve has the form of a substantially rectangular hysteresis loop shown in FIGURE 5.

It will then be possible to change the reluctance of the coil carrier by varying its distance from the permanent magnet and to maintain this condition even after moving the coil carrier to a greater distance. The production of a control signal with the simultaneous return of the coil carrier to its initial magnetic condition will then result from a properly polarized sensing impulse in a primary coil whereby a strong outgoing signal will be induced in a secondary coil. On the other hand, without any antecedent movement of the punch or change of magnetic remanence of the spool structure, there will be produced in the secondary coil only a weak voltage impulse of small amplitude and of short duration which can be easily distinguished from a controlling impulse. The advantage of such a contrivance is that the production of the control impulse within the time limits of a working cycle will be independent of the working movement of the punch because the duration of a sensing impulse can be conveniently adjusted to such time limits.

The last described method of operation is set forth in FIGURE 3 in two successive work periods $T_1$ and $T_2$ during the time $t$. Here the first line (a) represents the up and down movement of the reciprocating punch which occurs during the first period $T_1$ but not during the second period $T_2$. Line (b) shows the change of remanence of the coil body at the time $t_0$ and its return to its original remanence condition at time $t_1$. The first-mentioned change is effected by the lifting of the punch while the return to the original condition is effected by a sensing impulse $p$. By changing the remanence condition, the voltage impulses of opposite polarity indicated in line (d) are induced in a secondary coil of the coil carrier at time $t_0$ and $t_1$. The time of the last impulse can be determined thereby with the help of the sensing impulses. In the second work period, during which the punch does not operate, there occurs no change of remanence so that the sensing impulse will be without effect, except for a slight disturbance signal S.

Figure 4:
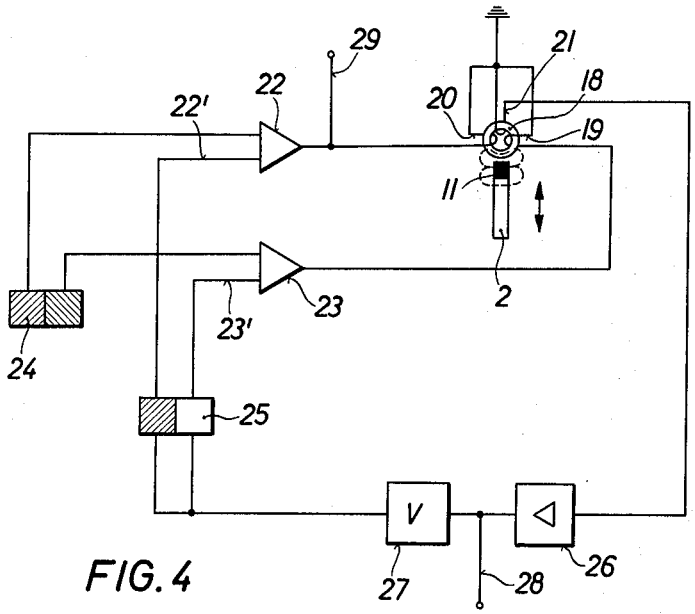
FIGURE 4 is a circuit diagram of another form of this invention.

FIGURE 4 shows the principal features of a circuit for the production of control signals. The annular core 18 which is at only a short distance from the permanent magnet 11 carries two sensing coils 19 and 20 as well as a reading coil 21. The sensing coils 19 and 20 are connected in parallel to an AND circuit 22 and 23 whose complementary input terminals are connected to a multi-vibrator 24. The AND circuit elements 22 and 23 are alternately energized through input terminals 22′ and 23′ corresponding to the output terminals of a bistable flip-flop 25 whose input is connected through a time delay member 27 and an amplifier 26 to a reading coil 21.

The method of operation of the circuit of FIGURE 4 will now be described with reference to the magnetization line in FIGURE 5.

At the start the annular core 18 will be in the remanence condition indicated by the point 30 on the magnetization curve, and while in this resting position it will be subjected to electric or magnetic impulses of amplitude 31. By these impulses the core will then be premagnetized to point 32 which is a safe distance in front of the lower bend 33 in the magnetization curve. During an upward movement of the punch, the permanent magnet will move into the neighborhood of the annular core 18 so as to bring the latter into a state of magnetization corresponding to point 34 on the curve. Point 34, however, is still below the lower bend 33 and will, therefore, not cause any reversal of the magnetization of the annular core.

The bent or knee portion 33 of the curve will be traversed only by current impulses in coil 19 which, when imposed on the core, will move the magnetization to the region 35 at the upper portion of the curve. This condition continues during the time $T_3$ while the punch is lifted. After the end of the working movement, the premagnetization by the permanent magnet 11 is discontinued and the magnetizing impulses in the sensing coil 19 now keep the magnetization in the region 36 of the upper portion of the hysteresis curve.

During the reversal of the magnetization of the annular core after the punch has been lifted, there is induced in the reading coil 21 a voltage impulse which is delivered through the amplifier 26 to the output terminal 28 as well as to the input terminal of the bistable flip-flop 25 with the delay $T_4$ (FIGURE 5) caused by the time delay member 27. At that time the flip-flop will switch over, and through the AND circuit will permit the multivibrator to energize the sensing coil 20 with resetting impulses 37 of large amplitude. Because of the use of two separate impulse channels for preparation and resetting independently of the optimum amplitude of the preparation impulse, the resetting amplitude 37 can be made as large as desired so as to make sure that the magnetization of the annular core will be brought back to the lower portion of the hysteresis curve.

As a control signal, use can be made either directly of one of the two oppositely polarized reading impulses at the output 28, or also of the signal at the output 29 which has been modulated by the resetting impulse. The impulse which was induced in the reading coil by resetting of the core, after passing through the amplifier 26 and the delay member 27, arrives likewise at the entrance of the flip-flop 25 and transposes the same. After a certain time interval determined by the retardation member 27, the resetting impulses are switched off in favor of the oppositely polarized preparation impulses, whereby the circuit will be returned to its initial condition.

It will be understood that this invention is susceptible to modification in order to adapt it to difference usages and conditions, and accordingly, it is desired to comprehend such modifications within this invention as may fall within the scope of the appended claims.

What is claimed is:

1. A sensing mechanism for a machine having a moving working member comprising; a first member means mounted on said working member to move therewith, a second member means stationarily mounted relative to said working member and comprising at least a first sensing coil member means, said first and second member means being movable relative to each other in a common magnetic field and on a line connecting said member means, and means responsive to changes in the strength of the magnetic field in said second member means to detect changes in the relative movement of said first and second member means toward and away from each other, at least said second member means having a hysteresis loop with a pronounced knee and the changes in the strength of the magnetic field therein taking place at said knee.

2. The mechanism as claimed in claim 1 in which said first member means is formed of a permanent magnet material and in which said second member means further comprises coil core means, and a second sensing coil member means, said first and second sensing coil member means being mounted on said core means, and means to energize said second sensing coil member means with a modulated sensing signal.

3. A sensing mechanism for a machine having a moving working member comprising; a first member mounted on said working member to move therewith, said first member being made of a highly permeable softly magnetic material, a second member stationarily mounted relative to said working member and comprising a coil core whose magnetization curve has a pronounced knee therein, said first and second members being movable relative to each other in a common magnetic field and in a straight line extending between said members, at least a first and a second coil means mounted on said coil core, means for sending a modulated sensing signal through said first coil means, means for sending a premagnetization current through said second coil means, and means responsive to magnetic flux changes in said second member to detect changes in the magnetic reluctance of the field between said first and second members according to the relative movement therebetween.

4. The mechanism as claimed in claim 3 in which said coil core is formed of a material whose magnetization curve has the form of a substantially rectangular hysteresis loop, and said magnetizing current maintaining the magnetization of said coil core at the knee of said hysteresis loop.

5. A sensing mechanism for a machine having a moving working member comprising; a first member mounted on said working member to move therewith and formed of a permanent magnet material, a second member stationarily mounted relative to said working member and comprising a coil core formed of a material whose magnetization curve has the form of a substantially rectangular hysteresis loop, said first and second members being movable relative to each other in a common magnetic field, at least a first and second coil means mounted on said coil core means, means for sending a premagnetization current through said first coil means, means for sending a modulated signal through said second coil means, and means responsive to changes in the magnetic field, said second member means to detect changes in the magnetic reluctance of the magnetic field between said first and second members according to the relative movement therebetween.

6. The mechanism as claimed in claim 5 in which said coil core is brought to a first excellent remanence condition by said pre-magnetization current and which is brought to a second excellent remanence condition by the relative movement between said first and second members and which retains said second condition independently of the further relative movement between said first and second member means, and means for delivering a resetting impulse to one of said coil means.

7. A sensing mechanism for a machine having a moving working member comprising; a first member mounted on said working member to move therewith and formed of a permanent magnet material, a second member stationarily mounted relative to said working member and comprising a coil core formed of a material whose magnetization curve has the form of a substantially rectangular hysteresis loop, said first and second members being movable relative to each other in a common magnetic field, first and second coil means mounted on said coil core, a reading coil mounted on said coil core, means for sending a premagnetization current through said first coil means to bring said coil core to a first excellent remanence condition adjacent one corner of said hysteresis loop, said coil core being brought to a second excellent remanence condition on the opposite side of said one corner by the relative movement between said first and second members and retaining said second condition independently of further relative movement therebetween, time delay means having the output of said reading coil connected to the input of said time delay means, and means interconnecting the output of said time delay means with said first and second coil means for energizing at least one of said first and second coil means with a magnetizing impulse of opposite polarity to the polarity of said second excellent remanence condition.

8. The mechanism as claimed in claim 7 in which said means interconnecting the output of said time delay means with said first and second coil means comprises bistable flip-flop circuit means and multi-vibrator means.

9. A sensing mechanism for a machine having a plurality of reciprocating punches for perforating a tape comprising; a first member mounted on each punch of said plurality of punches and formed of permanent magnet material, a second member stationarily mounted in said machine for each said punch of said plurality of punches, each of said first member and the pertaining second member being movable relative to each other in a pertaining common magnetic field, each said second member comprising a coil core whose hysteresis loop has a pronounced knee therein and first and second sensing coil means mounted on said coil core, and means to energize each one of said sensing coil means with a modulated signal to produce a first magnetic condition in the pertaining said coil core when the pertaining punch is in one extreme position and to produce a reversible permeability therein when the punch is reciprocated to the other extreme position.

10. In an arrangement for detecting working movements of a reciprocable member operable for performing working operations on a record piece movable over a flat supporting surface; a permanent magnet element on said member, a magnetic core element stationarily mounted adjacent said magnet element so relative movement between said elements from a first relative position to a second relative position will occur when said member moves in performing work operations, coil means on said core element including a magnetizing coil and a read out coil, means for supplying alternating current to said magnetizing coil to magnetize said core element to a region adjacent the knee of the magnetization curve thereof and on one side of said knee when said elements are in one of said relative positions thereof, and the region of magnetization of said core element shifting to the other side of said knee upon movement of said elements to the other of said relative positions thereof whereby the energization of said read out coil varies greatly from one of said relative positions of said elements to the other.

References Cited by the Examiner

UNITED STATES PATENTS 3,159,337   12/1964   MacNeill et al. _____ 234—33

OTHER REFERENCES

IBM Technical Disclosure Bulletin, vol. 3, No. 3, p. 35, August 1960, Punch Checking, Stanton et al., copy in group 340, 234–33.

WILLIAM W. DYER, JR., *Primary Examiner.*

WILLIAM S. LAWSON, *Examiner.*